United States Patent
Jiang et al.

(10) Patent No.: US 9,123,963 B2
(45) Date of Patent: Sep. 1, 2015

(54) DIRECT COATED MEMBRANE ELECTRODE ASSEMBLY ON EXTERNAL REINFORCEMENT FOR FUEL CELLS

(71) Applicant: GM Global Technology Operations LLC, Detroit, MI (US)

(72) Inventors: Ruichun Jiang, Rochester, NY (US); Matthew Dioguardi, Rochester, NY (US); Scott C. Moose, Victor, NY (US); Craig Gittleman, Rochester, NY (US); John P. Healy, Rochester Hills, MI (US); Bradley M. Houghtaling, Rochester, NY (US)

(73) Assignee: GM Global Technology Operations LLC, Detroit, MI (US)

(*) Notice: Subject to any disclaimer, the term of this patent is extended or adjusted under 35 U.S.C. 154(b) by 267 days.

(21) Appl. No.: 13/833,304

(22) Filed: Mar. 15, 2013

(65) Prior Publication Data
US 2014/0120458 A1    May 1, 2014

Related U.S. Application Data

(63) Continuation-in-part of application No. 13/071,603, filed on Mar. 25, 2011, now Pat. No. 8,962,213.

(51) Int. Cl.
*H01M 4/88* (2006.01)
*H01M 8/10* (2006.01)

(52) U.S. Cl.
CPC .......... *H01M 4/8828* (2013.01); *H01M 8/1004* (2013.01); *H01M 4/8807* (2013.01); *Y02E 60/521* (2013.01)

(58) Field of Classification Search
CPC .......................... H01M 4/8828; H01M 8/1004
USPC .............................................. 429/535; 427/77
See application file for complete search history.

(56) References Cited

U.S. PATENT DOCUMENTS

| | | | |
|---|---|---|---|
| 5,865,968 A * | 2/1999 | Denton et al. | 204/284 |
| 2005/0100776 A1* | 5/2005 | Brunk et al. | 429/35 |
| 2007/0077475 A1 | 4/2007 | Lai et al. | |
| 2009/0246592 A1 | 10/2009 | Kinoshita | |

FOREIGN PATENT DOCUMENTS

JP        05021077 A   *   1/1993  ............... H01M 8/02

OTHER PUBLICATIONS

Non-Final Office Action dated Jul. 25, 2013 pertaining to U.S. Appl. No. 13/071,603 filed Mar. 25, 2011.

* cited by examiner

*Primary Examiner* — Karie O'Neill Apicella
(74) *Attorney, Agent, or Firm* — Dinsmore & Shohl LLP

(57) ABSTRACT

Disclosed are methods for fabricating a reinforced membrane electrode assembly having one or more freestanding external reinforcement layers. The method comprises providing a freestanding external reinforcement layer, and depositing a catalyst solution and membrane solution onto at least a portion of the freestanding external reinforcement layer.

20 Claims, 5 Drawing Sheets

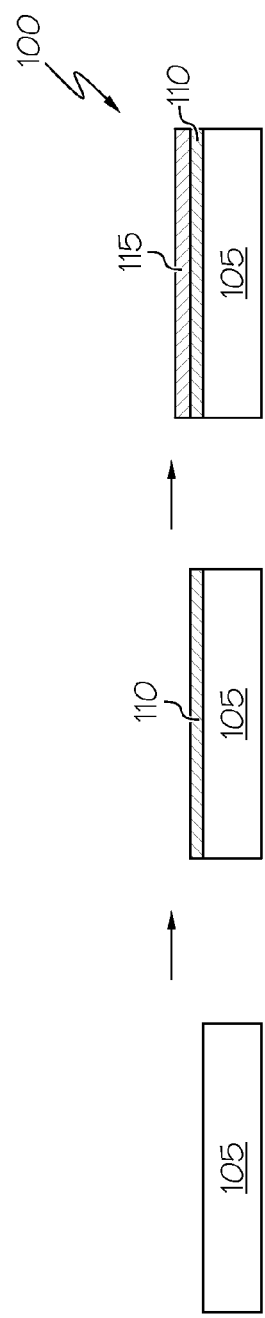
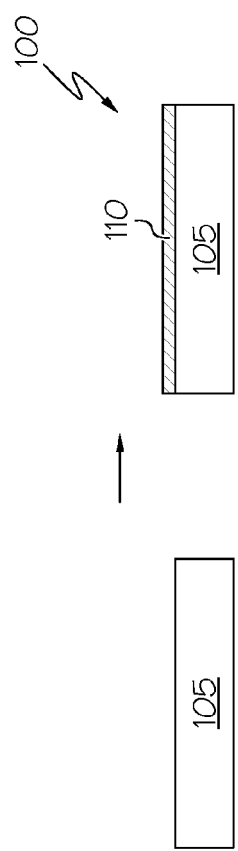

DIRECT COATED MEMBRANE ELECTRODE ASSEMBLY ON EXTERNAL REINFORCEMENT FOR FUEL CELLS

PRIORITY

This application is a continuation-in-part of U.S. patent application Ser. No. 13/071,603 filed Mar. 25, 2011, entitled "Directed Catalyst Coating on Freestanding Microporous Layer," which is incorporated herein by reference.

TECHNICAL FIELD

The embodiments described herein generally relate to a process for coating a fuel cell component, and more particularly, it relates to a process for the coating of multiple fuel cell component coatings on a freestanding external reinforcement structure.

BACKGROUND

Fuel cells, which are sometimes referred to as electrochemical conversion cells, produce electrical energy by processing reactants, for example, through the oxidation and reduction of hydrogen and oxygen. Hydrogen can be a very attractive fuel because it is clean and it can be used to produce electricity efficiently in a fuel cell. The automotive industry has expended significant resources in the development of hydrogen fuel cells as a source of power for vehicles. Vehicles powered by hydrogen fuel cells could be more efficient and generate fewer emissions than today's vehicles employing internal combustion engines.

In some fuel cell systems, hydrogen or a hydrogen-rich gas is supplied as a reactant through a flowpath to the anode side of a fuel cell, while oxygen (such as in the form of atmospheric oxygen) is supplied as a reactant through a separate flowpath to the cathode side of the fuel cell. The anode and cathode facilitate the electrochemical conversion of the reactants into electrons and positively charged ions (for the hydrogen) and negatively charged ions (for the oxygen). An electrolyte layer separates the anode from the cathode to allow the selective passage of ions to pass from the anode to the cathode while simultaneously prohibiting the passage of the generated electrons, which instead are forced to flow through an external electrically-conductive circuit (such as, a load) to perform useful work before recombining with the charged ions at the cathode. The combination of the positively and negatively charged ions at the cathode results in the production of non-polluting water as a byproduct of the reaction.

A conventional proton exchange membrane ("PEM") fuel cell may comprise a solid polymer electrolyte membrane (or a proton exchange membrane) with electrode layers on both sides of the polymer membrane forming a membrane electrode assembly ("MEA"). The membrane electrode assembly may be positioned between a pair of gas diffusion media layers, each of which have a microporous layer formed on diffusion media, and a cathode plate and an anode plate are placed outside of the gas diffusion media layers. The components are compressed to form a fuel cell.

Fuel cells, however, suffer from drawbacks that can decrease the life of a fuel cell. For example, the electrode layers coated on both sides of the solid polymer electrolyte membrane may have a reduced bond at the interface resulting in a less durable fuel cell. In addition, the life of the membrane, and therefore, the fuel cell, may be shortened because of one of a MEA over-compression and a MEA under-compression occurring at the subgasket. The manufacturing processes used to form the MEA may cause over-compression where the membrane swells and creates a compressive load variance across the MEA. This can result in permanent deformation of various components making up the MEA. Under-compression also may occur due to manufacturing processes and can result in buckling of the membrane. The buckling of the membrane may cause one of the anode electrode and the cathode electrode formed thereon to crack.

Therefore, alternative fuel cells, reinforced catalyst composite structures, membrane electrode assemblies, and methods of fabrication are disclosed herein

SUMMARY

In embodiments disclosed herein are methods of fabricating a reinforced catalyst composite structure. The methods comprise providing a freestanding external reinforcement layer, depositing a catalyst solution onto at least a portion of the freestanding external reinforcement layer to form a catalyst layer, and depositing a membrane solution onto at least a portion of the catalyst layer to form a reinforced catalyst composite structure.

In embodiments also disclosed herein are methods for fabricating a reinforced membrane electrode assembly. The methods comprise depositing a first catalyst solution onto at least a portion of a first freestanding external reinforcement layer to form a first catalyst layer on the first freestanding external reinforcement layer, depositing a first membrane solution onto at least a portion of the first catalyst layer to form a first membrane layer on the first catalyst layer, wherein the first freestanding external reinforcement layer, the first catalyst layer, and the first membrane layer together form a first reinforced catalyst composite structure, depositing a second catalyst solution onto at least a portion of a second freestanding external reinforcement layer to form a second catalyst layer, wherein the second freestanding external reinforcement layer and the second catalyst layer together form a second reinforced catalyst composite structure, and joining the first reinforced catalyst composite structure and the second reinforced catalyst composite structure to form a membrane electrode assembly, wherein joining is such that the first membrane layer is positioned between the first catalyst layer and the second catalyst layer.

In embodiments also disclosed herein are methods of fabricating a reinforced membrane electrode assembly. The methods comprise depositing a first catalyst solution onto at least a portion of a first freestanding external reinforcement layer to form a first catalyst layer on the first freestanding external reinforcement layer, depositing a first membrane solution onto at least a portion of the first catalyst layer to form a first membrane layer on the first catalyst layer, wherein the first freestanding external reinforcement layer, the first catalyst layer, and the first membrane layer together form a first reinforced catalyst composite structure, depositing a second catalyst solution onto at least a portion of a gas diffusion media to form a second catalyst layer, wherein the second freestanding external reinforcement layer and the gas diffusion media together form a second reinforced catalyst composite structure, and joining the first reinforced catalyst composite structure and the second reinforced catalyst composite structure to form a membrane electrode assembly, wherein joining is such that the first membrane layer is positioned between the first catalyst layer and the second catalyst layer.

Additional features and advantages of the embodiments for fuel cells, reinforced catalyst composite structures, membrane electrode assemblies, and methods of fabrication described herein will be set forth in the detailed description which follows, and in part will be readily apparent to those skilled in the art from that description or recognized by practicing the embodiments described herein, including the detailed description which follows, the claims, and the appended drawings.

Both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIGS. 1A & 1B schematically depict exemplary coating methods for fabricating a reinforced catalyst composite structure according to one or more embodiments shown and/or described herein.

DETAILED DESCRIPTION

Figure 2A:
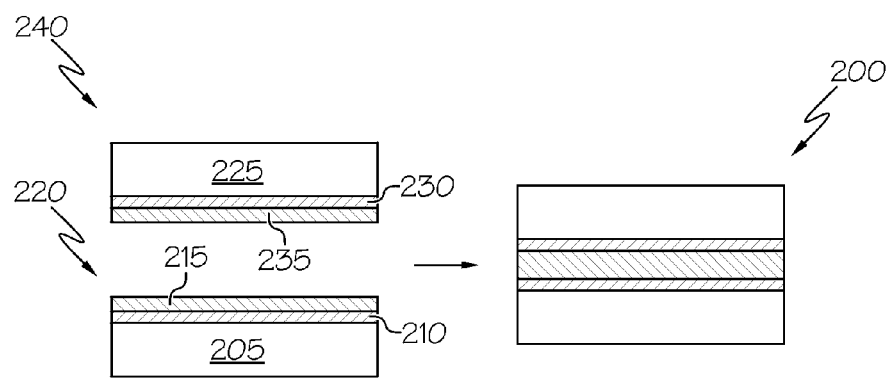
FIGS. 2A and 2B schematically depict two exemplary methods of fabricating a reinforced membrane assembly according to an aspect of the present invention.

Reference will now be made in detail to embodiments of products and methods for fabricating reinforced membrane electrode assemblies and subassemblies, examples of which are illustrated in the accompanying drawings. Whenever possible, the same reference numerals will be used throughout the drawings to refer to the same or like parts. Described herein are reinforced membrane electrode assemblies and subassemblies, and methods of fabrication.

The methods for fabricating a reinforced catalyst composite structure generally comprise providing a freestanding external reinforcement layer, depositing a catalyst solution onto at least a portion of the freestanding external reinforcement layer to form a catalyst layer, and depositing a membrane solution onto at least a portion of the catalyst layer to form a reinforced catalyst composite structure. By "freestanding" we mean unattached to a supporting unit (e.g., a substrate), and may be manipulated in a manufacturing process without minimal risk of wrinkling, folding, buckling or having other process damage.

In embodiments herein, the method may further comprise placing a shim frame on the freestanding external reinforcement layer prior to depositing the catalyst solution. In embodiments herein, the method may further comprise applying a vacuum to the freestanding external reinforcement layer to hold it in place. In embodiments herein, the method may further comprise drying the catalyst layer prior to depositing the membrane solution and/or drying the reinforced catalyst composite structure. In embodiments herein, the method may further comprise depositing the catalyst solution and the membrane solution simultaneously. In embodiments herein, the method may further comprise applying a membrane reinforcement layer onto the membrane solution.

The reinforced catalyst composite structure generally comprises a freestanding external reinforcement layer, a catalyst layer on the freestanding external reinforcement layer, and a membrane layer on the catalyst layer. In embodiments herein, the reinforced catalyst composite structure may further comprise a shim frame positioned between the freestanding external reinforcement layer and the catalyst layer.

Also described herein are methods for fabricating reinforced electrode assemblies. The methods generally comprise depositing a first catalyst solution onto at least a portion of a first freestanding external reinforcement layer to form a first catalyst layer on the first freestanding external reinforcement layer, depositing a first membrane solution onto at least a portion of the first catalyst layer to form a first membrane layer on the first catalyst layer, wherein the first freestanding external reinforcement layer, the first catalyst layer, and the first membrane layer together form a first reinforced catalyst composite structure, depositing a second catalyst solution onto at least a portion of a second freestanding external reinforcement layer to form a second catalyst layer, wherein the second freestanding external reinforcement layer and the second catalyst layer together form a second reinforced catalyst composite structure, and joining the first reinforced catalyst composite structure and the second reinforced catalyst composite structure to form a membrane electrode assembly, wherein joining is such that the first membrane layer is positioned between the first catalyst layer and the second catalyst layer. The first catalyst solution and the first membrane solution may be consecutively or simultaneously deposited.

In embodiments herein, the methods may further comprise depositing a second membrane solution onto at least a portion of the second catalyst layer to form a second membrane layer on the second catalyst layer, wherein the second freestanding external reinforcement layer, the second catalyst layer, and the second membrane layer together form a second reinforced catalyst composite structure, and joining the first reinforced catalyst composite structure and the second reinforced catalyst composite structure to form a membrane electrode assembly, wherein joining is such that the first membrane layer and the second membrane layer are positioned between the first catalyst layer and the second catalyst layer. The second catalyst solution and the second membrane solution may be consecutively or simultaneously deposited.

In embodiments herein, the methods may further comprise placing a first shim frame on the first freestanding external reinforcement layer prior to depositing the first catalyst solution, and/or a second shim frame on the second freestanding external reinforcement layer prior to depositing the second catalyst solution. In embodiments herein, the methods may further comprise applying a vacuum to the first and/or second freestanding external reinforcement layer to hold it in place. The vacuum may be applied prior to depositing the catalyst solutions and/or prior to depositing the membrane solutions. In embodiments herein, the methods may further comprise drying the first catalyst layer prior to depositing the membrane solution, drying the first reinforced catalyst composite structure, and/or drying the second reinforced catalyst composite structure. In embodiments herein, the methods may further comprise positioning a subgasket material between the first membrane layer and the second catalyst layer. In embodiments herein, the methods may further comprise positioning a subgasket material between the first membrane layer and the second membrane layer.

The reinforced electrode assembly may generally comprise a first freestanding external reinforcement layer, a first catalyst layer on the first freestanding external reinforcement layer, a first membrane layer on the first catalyst layer, a second catalyst layer on the first membrane layer, and a second freestanding external reinforcement layer on the second catalyst layer. In embodiments herein, a second membrane layer may be positioned between the first membrane layer and the second catalyst layer. In embodiments herein, a first shim frame may be positioned between the first freestanding external reinforcement layer and the first catalyst layer. In embodiments herein, a second shim frame may be positioned between the second freestanding external reinforcement layer and the second catalyst layer. In embodiments herein, a sub-gasket may be positioned between the first membrane layer and the second catalyst layer. In embodiments herein, a sub-gasket may be positioned between the first membrane layer and the second membrane layer.

Referring to FIGS. 1A & 1B, an exemplary method (100) of fabricating a reinforced catalyst composite structure is depicted. Referring to FIG. 1A, on the surface of freestanding external reinforcement layer (105), a catalyst solution being deposited to form a catalyst layer (110) and a membrane solution being deposited to form a membrane layer (115). The reinforced catalyst composite structure comprises a freestanding external reinforcement layer, a catalyst layer on the freestanding external reinforcement layer, and a membrane layer on the catalyst layer.

An optional membrane reinforcement layer (not depicted) may be applied to the membrane layer. Examples of suitable membrane reinforcement layers may include, but are not limited to, a polymer film, a metal screen, a woven fabric, or combinations thereof. Examples of suitable polymer films may include polytetrafluoroethylene (PTFE), expanded polytetrafluoroethylene (ePTFE), polyvinylidene fluoride (PVDF), or fluoroethylene propylene (FEP).

Referring to FIG. 1B, on the surface of freestanding external reinforcement layer (105), a catalyst solution being deposited to form a catalyst layer (110). The reinforced catalyst composite structure comprises a freestanding external reinforcement layer and a catalyst layer on the freestanding external reinforcement layer.

In embodiments herein, the catalyst and membrane solutions may be applied using a slot die coating process, slide coating process, curtain coating process, or combinations thereof. In some embodiments, a shim frame coating technique may be used to deposit the catalyst layers and membrane layers. A shim frame having a desired thickness and material composition is used. The shim frame coating technique can allow for more uniform coating thickness to be achieved. Coating thickness is controlled by the thickness of the shim. The shim frame can be made of a material that is dimensionally stable and which does not interact with any of the components found in the catalyst and membrane solutions used. Examples of suitable materials that may be used to form the shim frame include, but are not limited to, polyimide film (e.g., DuPont Kapton®), polyethylene naphthalate film (PEN) (e.g., DuPont Teonex®), ethylene tetrafluoroethylene (ETFE), stainless steel, and the like. The material and thickness of the shim frame used to deposit the catalyst layers and membrane layers can be the same or different, and the selection of shim frame materials and thickness may depend on the desired thickness of each deposited layer.

In such a technique, a shim frame having a desired thickness is placed on a freestanding external reinforcement layer. The freestanding external reinforcement layer and the frame are placed on a flat, porous surface. In some embodiments, the flat porous surface may be a porous plate, e.g., a graphite plate. A vacuum is applied to the opposite side of the flat, porous surface such that the freestanding external reinforcement layer is held in place due to suction. It should be understood, however, that other methods for holding the freestanding external reinforcement layer and/or the shim frame in place may be used. The coating material may initially be placed on the shim film without contacting the freestanding external reinforcement layer. A brush/slide bar may be used to slide the coating material such that the entire freestanding external reinforcement layer is covered. The coating thickness formed after each sliding pass may be determined by the thickness of the shim film and/or the composition of the catalyst solution (e.g., the amount of solid materials in the catalyst solution may result in an increased coating thickness per sliding pass). The catalyst coated freestanding external reinforcement layer may then be dried at a temperature between about 100 to about 1000° F., about 200 to about 800° F., about 300 to about 500° F. Drying may last from about 5 minutes to about 5 hours, from about 10 minutes to about 1 hour, from about 15 to about 30 minutes, from about 15 minutes to about 20 minutes. The coating process can be repeated as needed to obtain the desired catalyst thickness. Additional coating material may be placed on the shim film, and a brush/slide bar may be used to slide the coating material to cover any pre-existing catalyst layers. Using this process, the coated catalyst layers can have a smooth surface with no visible mud-cracking. Further, the catalyst coated freestanding external reinforcement layer can have little to no visible wrinkles or other damage that may occur during the coating process.

The shim frame coating technique may also be used to deposit the membrane layers. In such a technique, a shim frame having a desired thickness is placed on the catalyst layer. The freestanding external reinforcement layer coated with the catalyst layer and the frame are placed on a flat, porous surface. In some embodiments, the flat porous surface may be a porous plate, e.g., a graphite plate. A vacuum is applied to the opposite side of the flat, porous surface such that the freestanding external reinforcement layer having the catalyst layer formed thereon is held in place due to suction. The coating material may initially be placed on the shim film without contacting the catalyst layer. A brush/slide bar may be used to slide the coating material such that the entire catalyst layer is covered. The coating thickness formed after each sliding pass may be determined by the thickness of the shim film and/or the composition of the membrane solution (e.g., the amount of solid materials in the membrane solution may result in an increased coating thickness per sliding pass). The membrane & catalyst coated freestanding external reinforcement layer may then be dried at a temperature between about 100 to about 1000° F., about 200 to about 800° F., about 300 to about 500° F. Drying may last from about 5 minutes to about 5 hours, from about 10 minutes to about 1 hour, from about 15 to about 30 minutes, from about 15 minutes to about 20 minutes. The coating process can be repeated as needed to obtain the desired membrane thickness. Additional coating material may be placed on the shim film, and a brush/slide bar may be used to slide the coating material to cover any pre-existing membrane layers.

In embodiments herein, examples of suitable freestanding external reinforcement layer may include expanded Teflon (ePTFE), metal screens, woven fabrics, and other suitable materials apparent to those of ordinary skill in the art, including, for example, organic and/or inorganic fibers and powders. In some examples, a freestanding external reinforcement layer commercially available from W. L. Gore & Associate (Gore), of Maryland, under the designation Carbel® MP30Z, may be used. The freestanding external reinforcement layer material may generally contain electrically conductive materials (e.g., carbon powders) and other support materials (e.g., hydrophobic fluoropolymers). Unlike a microporous layer ("MPL") typically found joined to a diffusion media substrate, the freestanding external reinforcement layer used herein holds together stably without the use of a diffusion media (or other type of) substrate.

In embodiments herein, the membrane solution may comprise one or more polymer electrolyte ionomers. The polymer electrolyte ionomers useful in the present invention may be highly fluorinated and, in some examples, perfluorinated, but may also be partially fluorinated or non-fluorinated. Examples of fluorinated polymer electrolyte ionomers useful in the present invention can include copolymers of tetrafluoroethylene and one or more fluorinated, acid-functional co-monomers, tetrafluoroethylene-fluorovinyl ether copolymer, perfluorosulfonic acids (PFSAs), sulfonated perfluorocyclobutanes (S-PFCBs), or mixtures thereof. The ionomer materials are used in a liquid composition, i.e. dissolved or dispersed in a suitable solvent. Many fluorine-containing ionomer materials can be obtained in the form of an aqueous solution in various concentrations. The ionomer content of the solutions may range from about 5% to about 30% by weight of the solution. Of course, ionomer materials supplied in the form of aqueous dispersions may also be used. Such dispersions may include, for example, Nafion® PFSA polymer dispersions sold by DuPont. Examples of fluorine-free, ionomer materials that may be used can include hydrocarbon polymers, sulfonated polyether ketones, sulfonated aryl ketones, acid-doped polybenzimidazoles, sulfonated polysulfone, and sulfonated polystyrene.

The membrane solution may further comprise one or more solvents. Examples of suitable solvents include, but are not limited to, water, isopropyl alcohol, methanol, ethanol, n-propanol, n-butyl alcohol, sec-butyl alcohol, tert-butyl alcohol, 2-methyl-2-butanol, 2-methyl-2-pentanol, 2,3-dimethyl-2-butanol, 2,3-dimethyl-2,3-butanediol, 2,4-dimethyl-2,4-pentanediol, 2,4-dimethyl-2,4-hexanediol, 2,5-dimethylhexan-2,5-diol, 3-hydroxy-3-methyl-2-butanone and 4-hydroxy-4-methyl-2-pentanone (diacetone alcohol), dimethylacetamide and mixtures thereof.

Ion-exchange membranes can degrade over time when subjected to the chemical environment found in a typical PEM fuel cell. One mechanism by which ion conducting polymer membranes may degrade is via loss of fluorine (i.e., fluoride emission) under open circuit voltage (OCV) and dry operating conditions at elevated temperatures. Another mechanism that may contribute to the degradation of an ion conducting polymer membranes by reaction with reactive species, such as hydrogen peroxide or hydroxyl radicals. To reduce membrane degradation, the use of chemical degradation mitigants may be required. Suitable chemical degradation mitigants that inhibit polymeric degradation may include cerium-containing compounds, manganese-containing compounds, and a porphyrin-containing compound. In one example, the mitigant comprises a platinum nanoparticle, $CeO_2$, or $MnO_2$. Other suitable examples may include a soluble sulfonate ($SO_4^{-2}$), carbonate ($CO_3^{-2}$) or nitrate ($NO_3^{-2}$) salt of any of the following metal ions alone, or in combination, $Co^{2+}$, $Co^{3+}$, $Fe^{2+}$, $Fe^{3+}$, $Mg^{1+}$, $Mg^{2+}$, $Mn^{1+}$, $Mn^{2+}$, $Mn^{3+}$, $Cl\ Mn^{3+}$, $HO\ Mn^{3+}$, $Cu^{1+}$, $Cu^{2+}$, $Ni^{1+}$, $Ni^{2+}$, $Pd^{1+}$, $Pd^{2+}$, $Ru^{1+}$, $Ru^{2+}$, $Ru^{4+}$, $Vn^{4+}$, $Zn^{1+}$, $Zn^{2+}$, $Al^{3+}$, B, $Si(OH)_2^{2+}$, $Al^{3+}$, $HOIn^{3+}$, $Pb^{2+}$, $Ag^+$, $Sn^{2+}$, $Sn^{4+}$, $Ti^{3+}$, $Ti^{4+}$, $VO^+$, $Pt^{2+}$, $Ce^{3+}$, or $Ce^{4+}$.

In some embodiments, the membrane may be annealed after a drying step to help obtain the necessary durability. Annealing can involve heating the membrane to a temperature above its glass transition temperature, then slowly cooling it down to form crystalline domains in an arrangement that imparts rigidity and strength to the membrane. The dry thickness of the membrane may range from about 1 micron to about 300 microns.

In embodiments herein, the catalyst solution may be used to form a cathode layer or an anode layer. The catalyst solution may comprise a solvent, an ionomer, and a catalyst. The catalyst solution may be prepared by adding catalyst and milling media to a bottle, along with the solvent and ionomer to form a catalyst solution. The catalyst solution may then be milled by, for e.g., placing the bottle containing the catalyst solution on a ball mill and rotating the bottle in the presence of milling media.

Any suitable catalyst may be used in the practice of the present invention. In some examples, the catalyst may be catalyst metal coated onto the surface of an electrically conductive support. Generally, carbon-supported catalyst particles are used. Carbon-supported catalyst particles are about 50-90% carbon and about 10-50% catalyst metal by weight. The catalyst may be a finely divided precious metal having catalytic activity. Suitable precious metals include, but are not limited to, platinum group metal, such as platinum, palladium, iridium, rhodium, ruthenium, and their alloys, such as, for e.g., a platinum-cobalt alloy.

The solvent may include isopropyl alcohol, methanol, ethanol, n-propanol, n-butyl alcohol, sec-butyl alcohol, tert-butyl alcohol, water, 2-methyl-2-butanol, 2-methyl-2-pentanol, 2,3-dimethyl-2-butanol, 2,3-dimethyl-2,3-butanediol, 2,4-dimethyl-2,4-pentanediol, 2,4-dimethyl-2,4-hexanediol, 2,5-dimethylhexan-2,5-diol, 3-hydroxy-3-methyl-2-butanone and 4-hydroxy-4-methyl-2-pentanone (diacetone alcohol), dimethylacetamide and mixtures thereof. The solvent may be present in the catalyst solution in an amount of from about 1% to about 90% by weight, in some examples from about 5% to about 80% by weight, and in further examples from about 10% to about 50% by weight of the catalyst solution.

The ionomer material used in the catalyst solution may or may not be the same ionomer material used in the membrane solution. Suitable ionomer materials include, but are not limited to, copolymers of tetrafluoroethylene and one or more fluorinated, acid-functional co-monomers, tetrafluoroethylene-fluorovinyl ether copolymer, perfluorosulfonic acids (PFSAs), sulfonated perfluorocyclobutanes (S-PFCBs), hydrocarbon polymers, sulfonated polyether ketones, sulfonated aryl ketones, acid-doped polybenzimidazoles, sulfonated polysulfone, sulfonated polystyrene, and mixtures thereof. Generally, the ionomer materials in the catalyst solution should be used in a liquid composition, i.e. dissolved or dispersed in a suitable solvent. Many fluorine-containing ionomer materials can be obtained in the form of an aqueous solution in various concentrations. The ionomer content of the solutions may range from about 5% to about 30% by weight of the solution. Of course, ionomer materials supplied in the form of aqueous dispersions may also be used. Such dispersions may include, for example, Nafion® PFSA polymer dispersions sold by DuPont.

Other additives, such as binders, cosolvents, crack reducing agents, wetting agents, antifoaming agents, surfactants, anti-settling agents, preservatives, pore formers, leveling agents, stabilizers, pH modifiers, milling aids and other substances, can be used as needed in the catalyst solution to improve coatablity. Furthermore, basic agents such as sodium hydroxide (NaOH) or potassium hydroxide (KOH) can be added for buffering of the acid groups of the ionomer.

In some embodiments, the catalyst solution further comprises a crack reducing agent. Electrodes made from the catalyst solution can form a network of cracks on the surface, which is called "mud cracking." It is believed that "mud cracking" occurs due to the stresses that develop as the wet film dries and the solid materials begin to consolidate. Not wishing to be bound by theory, the cracks may form due to stress gradients resulting from local thickness differences in the wet film. The cracks may also form following drying due to an inherent weakness of the electrode. The electrode is formed from a porous matrix of the carbon support bound by the ionomer, which is a relatively weak binder. As a result, the matrix of the carbon support provides minimal reinforcement to the ionomer, and the resulting matrix may not withstand the substantial stresses during the drying of the catalyst solution, resulting in a greater opportunity for the cracks to form during operation of the fuel cell. If the tensile strength of the film is in sufficient to overcome the induced drying stress, mud cracks can form to relieve the film of the stress. Thus, a crack reducing agent may be added to the catalyst solution to prevent the formation of mud cracks.

Examples of suitable crack reducing agents can include, but are not limited to, the addition of relatively high boiling solvents, for example, diacetone alcohol, as well as carbon fibers, nanoclay platelets (available from Southern Clay Product of Gonzales, Tex.), or a mixture of low equivalent weight ionomers and high equivalent weight ionomers, or combinations thereof. The diacetone alcohol may be present in an amount up to about 30 wt. % of a cathode ink. The carbon fibers may be about 10-20 micrometers in length and 0.15 μm in diameter. The carbon fibers may be present in a ratio of about 1:6 (w/w) fibers:catalyst. In addition, as disclosed above, the catalyst solution comprises ionomer material. Low equivalent weight (less than about 800EW) ionomers or a mixture of low equivalent weight ionomers and high equivalent weight ionomers (greater than about 800EW) may be used to mitigate the occurrence of mud cracks. In some examples, the ionomer material may be a mixture of ionomers having a high equivalent weight of greater than about 850 and a low equivalent weight of less than about 750.

Figure 2B:
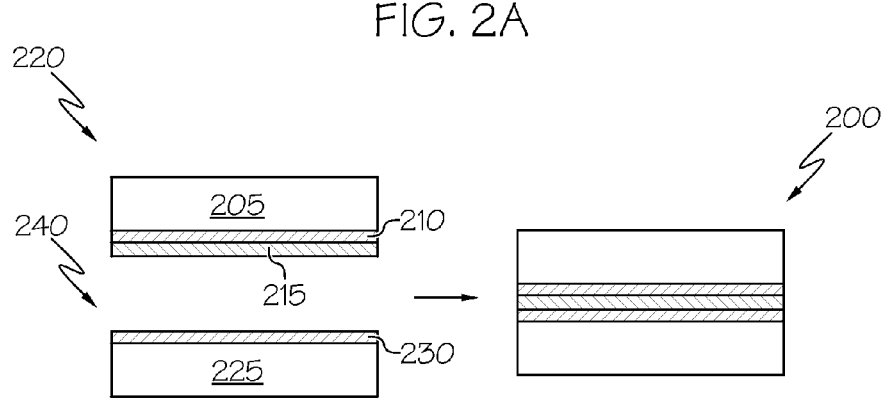

Referring to FIGS. 2A & 2B, an exemplary method of fabricating a reinforced membrane electrode assembly (200) is depicted. Referring to FIG. 2A, on the surface of a first freestanding external reinforcement layer (205), a first catalyst solution is deposited onto at least a portion of the first freestanding external reinforcement layer (205) to form a first catalyst layer (210). The first catalyst layer (210) may be an anode or cathode. The first catalyst layer (210) may optionally be dried prior to deposition of a first membrane solution. A first membrane solution is deposited onto at least a portion of the surface of the first catalyst layer (210) to form a first membrane layer (215). An optional membrane reinforcement layer (not depicted) as described herein may be applied to the first membrane layer (215).

In some embodiments, the first catalyst solution and the first membrane solution are simultaneously deposited. Where simultaneous deposition occurs, the optional drying step between deposition of the first catalyst solution and the first membrane solution will not occur. The first freestanding external reinforcement layer (205), first catalyst layer (210), and first membrane layer (215) together form a first reinforced catalyst composite structure (220). The first reinforced catalyst composite structure (220) may optionally be dried.

Still referring to FIG. 2A, on the surface of a second freestanding external reinforcement layer (225), a second catalyst solution is deposited onto at least a portion of the second freestanding external reinforcement layer (225) to form a second catalyst layer (230). The second catalyst layer (230) may be an anode or cathode. Where the first catalyst layer is a cathode, then the second catalyst layer is an anode, and vice versa. The second catalyst layer (230) may optionally be dried prior to deposition of a second membrane solution. A second membrane solution is deposited onto at least a portion of the surface of the second catalyst layer (230) to form a second membrane layer (235). An optional membrane reinforcement layer (not depicted) as described herein may be applied to the second membrane layer (235).

In some embodiments, the second catalyst solution and the second membrane solution are simultaneously deposited. Where simultaneous deposition occurs, the optional drying step between deposition of the second catalyst solution and the second membrane solution will not occur. The second freestanding external reinforcement layer (225), second catalyst layer (230), and second membrane layer (235) together form a second reinforced catalyst composite structure (240). The second reinforced catalyst composite structure (240) may optionally be dried.

Still referring to FIG. 2A, the first reinforced catalyst composite structure (220) and the second reinforced catalyst composite structure (240) are joined to form a reinforced membrane electrode assembly (200). In embodiments herein, the first reinforced catalyst composite structure (220) and the second reinforced catalyst composite structure (240) are hot-pressed or laminated together.

Referring to FIG. 2B, on the surface of a first freestanding external reinforcement layer (205), a first catalyst solution is deposited onto at least a portion of the first freestanding external reinforcement layer (205) to form a first catalyst layer (210). The first catalyst layer (210) may be an anode or cathode. The first catalyst layer (210) may optionally be dried prior to deposition of a first membrane solution. A first membrane solution is deposited onto at least a portion of the surface of the first catalyst layer (210) to form a first membrane layer (215). In some embodiments, the first catalyst solution and the first membrane solution are simultaneously deposited. Where simultaneous deposition occurs, the optional drying step between deposition of the first catalyst solution and the first membrane solution will not occur. The first freestanding external reinforcement layer (205), first catalyst layer (210), and first membrane layer (215) together form a first reinforced catalyst composite structure (220). The first reinforced catalyst composite structure (220) may optionally be dried.

Still referring to FIG. 2B, on the surface of a second freestanding external reinforcement layer (225), a second catalyst solution is deposited onto at least a portion of the second freestanding external reinforcement layer (225) to form a second catalyst layer (230). The second catalyst layer (230) may be an anode or cathode. Where the first catalyst layer is a cathode, then the second catalyst layer is an anode, and vice versa. The second freestanding external reinforcement layer (225) and the second catalyst layer (230) together form a second reinforced catalyst composite structure (240). The second reinforced catalyst composite structure (240) may optionally be dried.

Still referring to FIG. 2B, the first reinforced catalyst composite structure (220) and the second reinforced catalyst composite structure (240) are joined to form a reinforced membrane electrode assembly (200). The two composite structures are joined such that each freestanding external reinforcement layer is on the exterior. Thus, the catalyst layers and the one or more membrane layers are located between the first and second freestanding external reinforcement layers. The first reinforced catalyst composite structure (220)

and the second reinforced catalyst composite structure (240) may be joined together by hot-pressing or lamination.

In embodiments herein, the first reinforced catalyst composite structure (220) and the second reinforced catalyst composite structure (240) may be joined using a pressure ranging from about 50 to about 500 psi, from about 75 to about 400 psi, from about 100 to about 300 psi, and/or from about 150 to about 250 psi. In some embodiments, the first reinforced catalyst composite structure (220) and the second reinforced catalyst composite structure (240) may be joined at a temperature ranging from about 100° F. to about 1000° F., from about 150° F. to about 750° F., from about 200° F. to about 500° F., and/or from about 250° F. to about 350° F. Of course, other methods suitable for joining composite structures to form a reinforced membrane electrode assembly may be used.

In embodiments herein, a substrate, e.g., gas diffusion media, may be optionally used in place of one of the freestanding external reinforcement layer such that the MEA structure has an external reinforcement layer on one of the outer sides and a substrate on the other. The catalyst layers and the one or more membrane layers are located between the freestanding external reinforcement layer and the substrate.

Without being bound by theory, it is believed that the membrane electrode assemblies formed according to the inventive processes described herein result in freestanding reinforcement layers placed on both of the anode and the cathode, which can provide good support for the polymer electrolyte membrane. Additionally, it is believed that such support may reduce buckling that can occur during operation of a fuel cell, and therefore, improved fuel cell durability.

In embodiments herein, a subgasket may optionally be positioned between the first reinforced catalyst composite structure (220) and the second reinforced catalyst composite structure (240) prior to joining. The subgasket may vary in shape and size of the frame, as well as shape and size of the active area window formed therein. In some embodiments, the subgasket active area window may be sized smaller than the active area of the first reinforced catalyst composite structure and/or the second reinforced catalyst composite structure. In some embodiments, the subgasket frame may sized to match the size of one or both of the first reinforced catalyst composite structure and the second reinforced catalyst composite structure. The subgasket may comprise a stiff film having electrical insulating properties. The subgasket can be a single layer sheet or film or a multi-layer sheet or film. The subgasket may be bonded to membrane layer of either the first reinforced catalyst composite structure or the second reinforced catalyst composite structure using at least one of compression and an adhesive.

The resultant reinforced membrane electrode assembly can then be placed between a pair of diffusion media together with other parts, which may include gas flow field plates, current collector and end plates, to form a single fuel cell.

The embodiments described herein may be further illustrated by the following non-limiting examples.

Comparative Example

A reference catalyst coated diffusion media ("CCDM") membrane electrode assembly was prepared using two pieces of catalyst coated diffusion media that were bonded together with a polymer electrolyte membrane ("PEM"). To form the catalyst coated diffusion media, a carbon paper substrate having a microporous layer (MPL) was used as the gas diffusion media. A cathode catalyst solution containing Pt/Vulcan catalyst with a loading of 0.4 mg Pt/cm$^2$ was coated on a first gas diffusion media to form a cathode coated diffusion media. The cathode coated diffusion media was dried. An anode catalyst solution containing Pt/Vulcan catalyst with a loading of 0.05 mg Pt/cm$^2$ was coated onto a second gas diffusion media to form an anode coated diffusion media. The anode coated diffusion media was dried. After drying, the two pieces of catalyst coated diffusion media were bonded onto both sides of a PEM (12 μm Nafion® membrane coated from DE2020 ionomer solution) by a hot press method at a temperature of 295° F., and 200 psi compression pressure to form a CCDM.

Example 1

A cathode catalyst solution containing Pt/Vulcan catalyst with a loading of 0.4 mg Pt/cm$^2$ was coated onto a first freestanding external reinforcement layer (Carbel® MP30Z from W. L. Gore & Associate (Gore), of Maryland) to form a cathode catalyst layer. A DE2020 solution was coated onto the catalyst layer to form a 6 μm thick Nafion® membrane layer. The first freestanding external reinforcement layer, the cathode, and the membrane together form a reinforced cathode composite structure.

An anode catalyst solution containing Pt/Vulcan catalyst with a loading of 0.05 mg Pt/cm$^2$ was coated onto a second freestanding external reinforcement layer (Carbel® MP30Z from W. L. Gore & Associate (Gore), of Maryland) to form an anode catalyst layer. A DE2020 solution was coated onto the catalyst layer to form a 6 μm thick Nafion® membrane layer. The second freestanding external reinforcement layer, the anode, and the membrane together form a reinforced anode composite structure.

The reinforced anode composite structure was bonded to the reinforced cathode composite structure such that the membrane layers are joined and positioned between the anode and cathode layers. Prior to joining, a subgasket was inserted between the two composite structures, and specifically, between the membrane layer of the reinforced anode composite structure and the membrane layer of the reinforced cathode composite structure. Joining was done by hot pressing the reinforced anode composite structure, the reinforced cathode composite structure, and the subgasket together using a compression pressure of about 150-200 psi and a temperature of about 280-350° F. to form a reinforced membrane electrode assembly. The reinforced membrane electrode assembly has a 12 μm membrane thickness between the anode and cathode layers, each of which is affixed to an external reinforcement layer.

Figure 3:
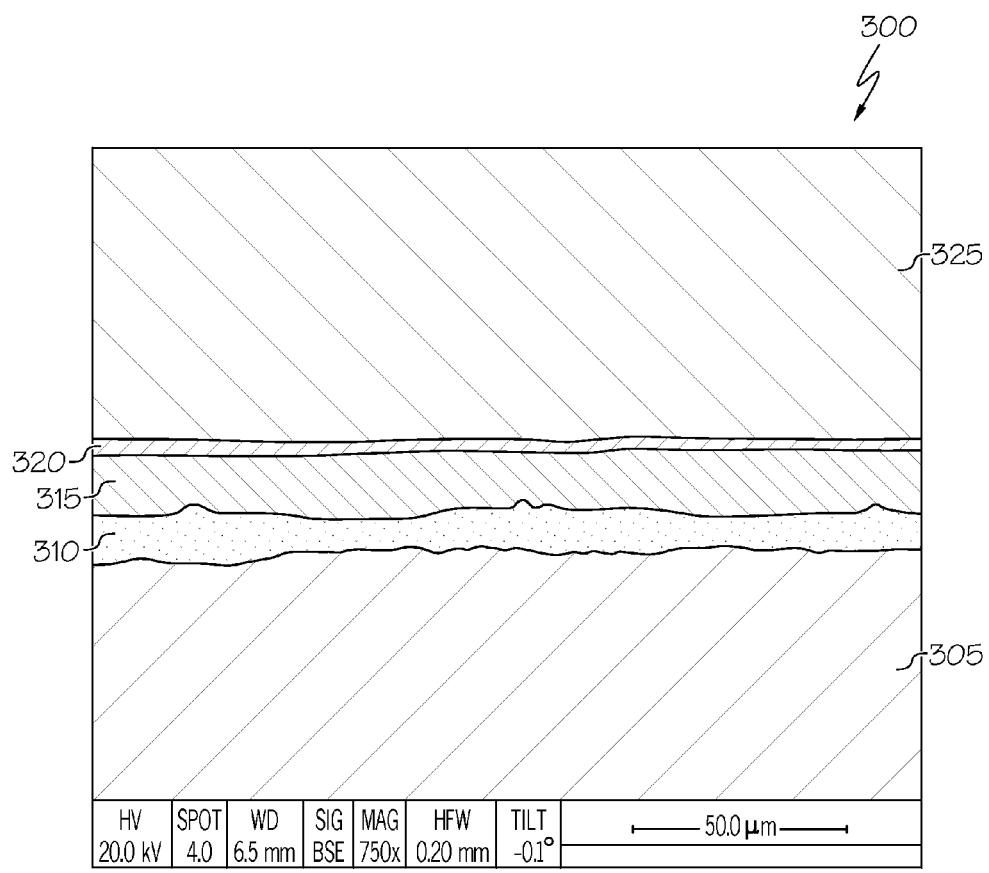
FIG. 3 depicts a scanning electron micrograph of a of a reinforced membrane assembly according to one or more embodiments shown and/or described herein.

A scanning electron microscopy (SEM) image was taken of a cross-section of the reinforced membrane electrode assembly (300) formed according to the process described in Example 1. Referring to FIG. 3, depicted is the reinforced membrane electrode assembly (300) comprising a first external reinforcement layer (305), a cathode layer (310), a membrane layer (310), an anode layer (320), and a second reinforcement layer (325).

Figure 4:
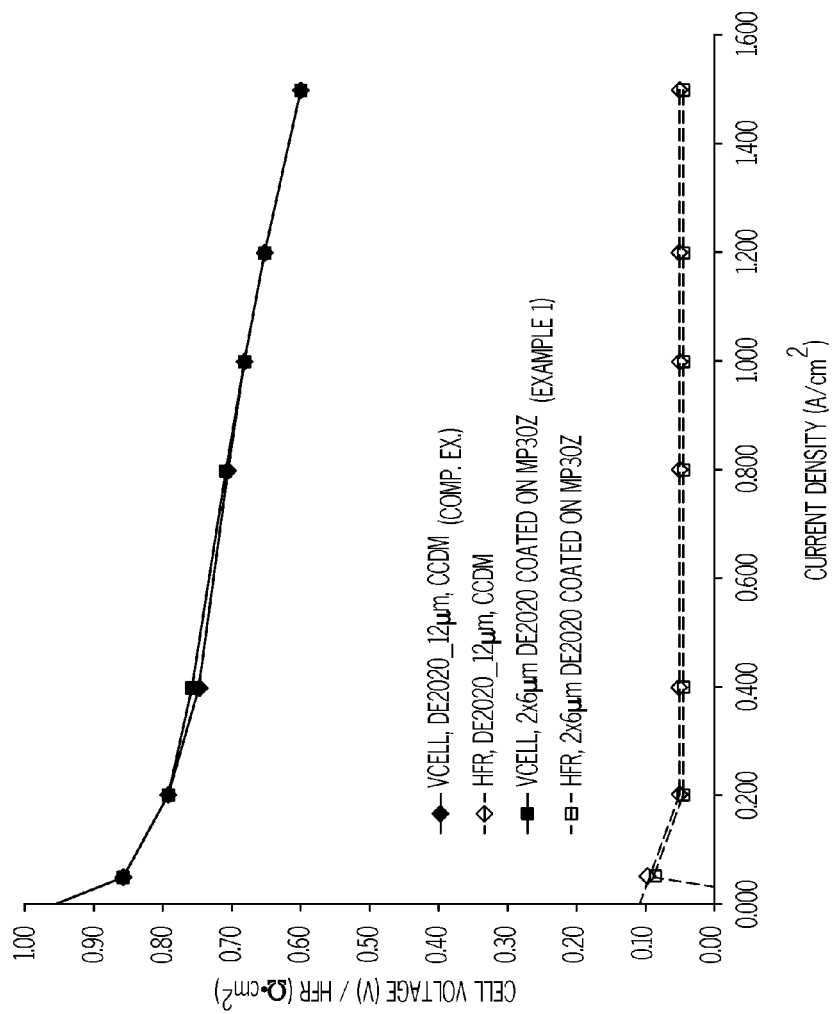
FIG. 4 graphically depicts a chart comparing performance of a fuel cell formed according to one or more embodiments shown and/or described herein.

Referring to FIG. 4, the reference membrane electrode assembly (comparative example) and the reinforced MEA (Example 1) were tested for fuel cell performance under the same operating conditions of a H$_2$/Air flow having a 1.5/2.0 stoichometry, an 80° C. cell temperature and a 85% Relative Humidity (RH)$_{outlet}$. The cell voltage (Vcell) and High Frequency Resistance (HFR) performance as a function of current density were measured, and are shown in FIG. 4. As shown in FIG. 4, Example 1 and the Comparative Example have a similar performance in Vcell and HFR. Thus, Example 1 behaves similarly to the Comparative Example, and that the external reinforcement layers do not increase resistance loss during fuel cell performance.

Figure 5:
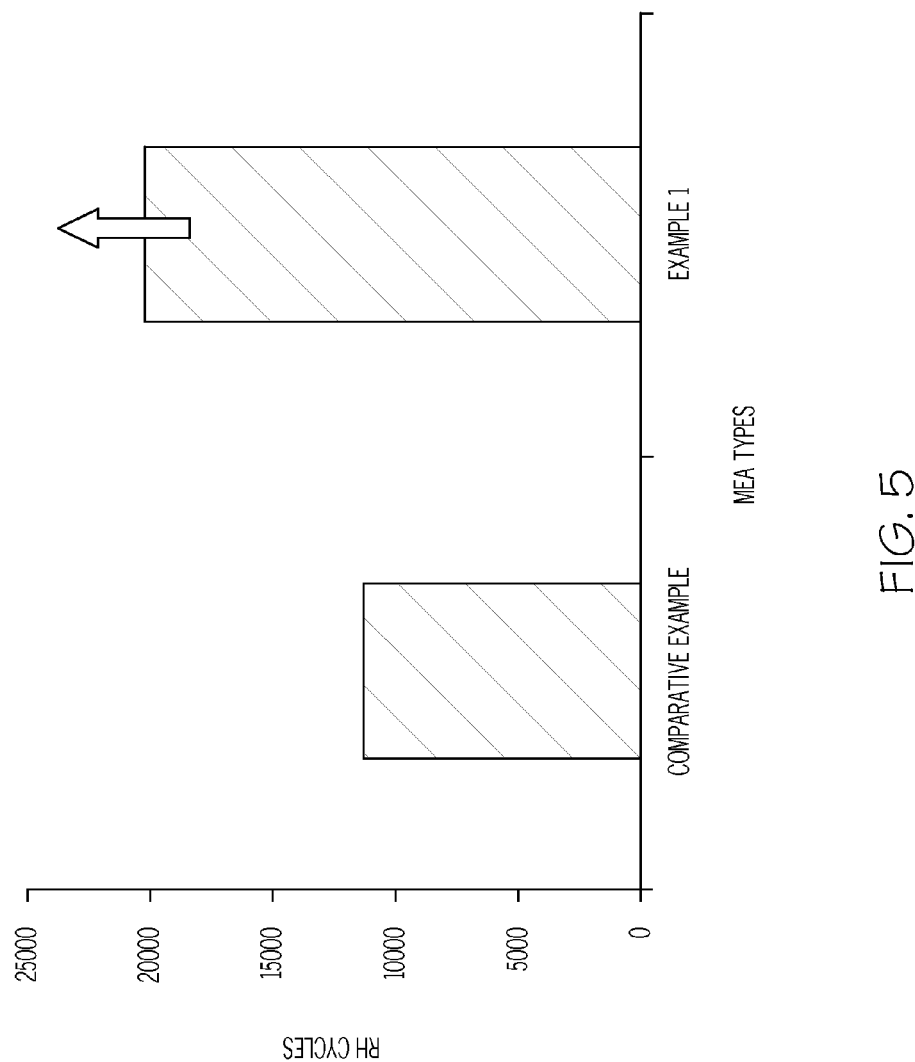
FIG. 5 graphically depicts a chart comparing durability of a fuel cell formed according to one or more embodiments shown and/or described herein.

Referring to FIG. 5, the reference membrane electrode assembly (comparative example) and the reinforced MEA (Example 1) were also tested for fuel cell durability by relative humidity (RH) cycling under the same operating conditions. Cell Built with 50 cm$^2$ cell with 2 mm lands and 2 mm straight channels flow field. Tests were conducted in relative humidity cycles of 2 min 150% RH H$_2$/air and 2 min 0% RH H$_2$/air flow. Tests were conducted at 80° C. cell temperature, 0 kPa gauge pressure, and 20 SLPM anode and cathode stoichiometries in counter-flow. Diagnostics were conducted to check physical crossover leak (failure=10 sccm) under air/air with 3 psi gas pressure difference. As shown in FIG. 5, the reference membrane electrode assembly (comparative example) failed during the RH cycling tests within 11,000 cycles with over 10 sccm gas leak. The reinforced MEA (Example 1) passed the RH cycling test with over 20,000 cycles without a leak. Thus, reinforced MEA (Example 1) has improved durability over the reference membrane electrode assembly (comparative example).

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of fabricating a reinforced catalyst composite structure comprising:
   providing a freestanding external reinforcement layer;
   depositing a catalyst solution onto at least a portion of the freestanding external reinforcement layer to form a catalyst layer; and
   depositing a membrane solution onto at least a portion of the catalyst layer to form a reinforced catalyst composite structure.

2. The method of claim 1, wherein the method further comprises placing a shim frame on the freestanding external reinforcement layer prior to depositing the catalyst solution.

3. The method of claim 1, wherein the method further comprises placing a shim frame on the catalyst layer prior to depositing the membrane solution.

4. The method of claim 1, wherein the method further comprises drying the catalyst layer prior to depositing the membrane solution.

5. The method of claim 1, wherein the method further comprises drying the reinforced catalyst composite structure.

6. The method of claim 1, wherein the catalyst solution and the membrane solution are simultaneously deposited.

7. The method of claim 6, wherein the method further comprises drying the reinforced catalyst composite structure.

8. The method of claim 1, wherein the method further comprises applying a vacuum to the freestanding external reinforcement layer to hold it in place.

9. A method of fabricating a reinforced membrane electrode assembly, the method comprising:
   depositing a first catalyst solution onto at least a portion of a first freestanding external reinforcement layer to form a first catalyst layer on the first freestanding external reinforcement layer;
   depositing a first membrane solution onto at least a portion of the first catalyst layer to form a first membrane layer on the first catalyst layer, wherein the first freestanding external reinforcement layer, the first catalyst layer, and the first membrane layer together form a first reinforced catalyst composite structure;
   depositing a second catalyst solution onto at least a portion of a second freestanding external reinforcement layer to form a second catalyst layer, wherein the second freestanding external reinforcement layer and the second catalyst layer together form a second reinforced catalyst composite structure; and
   joining the first reinforced catalyst composite structure and the second reinforced catalyst composite structure to form a membrane electrode assembly, wherein joining is such that the first membrane layer is positioned between the first catalyst layer and the second catalyst layer.

10. The method of claim 9, wherein the method further comprises placing a first shim frame on the first freestanding external reinforcement layer prior to depositing the first catalyst solution.

11. The method of claim 9, wherein the method further comprises placing a second shim frame on the second freestanding external reinforcement layer prior to depositing the second catalyst solution.

12. The method of claim 9, wherein the method further comprises applying a vacuum to the first and/or second freestanding external reinforcement layer to hold it in place.

13. The method of claim 9, wherein the method further comprises drying the first catalyst layer prior to depositing the membrane solution.

14. The method of claim 9, wherein the method further comprises drying the first reinforced catalyst composite structure and drying the second reinforced catalyst composite structure.

15. The method of claim 9, wherein the method further comprises positioning a subgasket material between the first membrane layer and the second catalyst layer.

16. The method of claim 9, wherein the first catalyst solution and the first membrane solution are simultaneously deposited.

17. The method of claim 16, wherein the method further comprises drying the first reinforced catalyst composite structure.

18. The method of claim 9, wherein the method further comprises:
   depositing a second membrane solution onto at least a portion of the second catalyst layer to form a second membrane layer on the second catalyst layer, wherein the second freestanding external reinforcement layer, the second catalyst layer, and the second membrane layer together form a second reinforced catalyst composite structure; and
   joining the first reinforced catalyst composite structure and the second reinforced catalyst composite structure to form a membrane electrode assembly, wherein joining is such that the first membrane layer and the second membrane layer are positioned between the first catalyst layer and the second catalyst layer.

19. The method of claim 18, wherein the method further comprises drying the first reinforced catalyst composite structure and drying the second reinforced catalyst composite structure.

20. The method of claim 18, wherein the method further comprises positioning a subgasket material between the first membrane layer and the second membrane layer.

* * * * *